United States Patent [19]

Cooper et al.

[11] Patent Number: 4,644,538
[45] Date of Patent: Feb. 17, 1987

[54] AUTOPILOT FLIGHT DIRECTOR SYSTEM

[75] Inventors: Michael G. Cooper, Renton; Elden M. Elliott, Coupeville; Dean A. Hartzell, Bellevue, all of Wash.

[73] Assignee: The Boeing Company, Seattle, Wash.

[21] Appl. No.: 432,894

[22] PCT Filed: Jun. 16, 1982

[86] PCT No.: PCT/US82/00825
 § 371 Date: Jun. 16, 1982
 § 102(e) Date: Jun. 16, 1982

[87] PCT Pub. No.: WO84/00071
 PCT Pub. Date: Jan. 5, 1984

[51] Int. Cl.⁴ .............................................. G06F 11/08
[52] U.S. Cl. ........................................ 371/9; 364/184; 364/434; 371/68
[58] Field of Search ............... 364/133, 150, 184, 424, 364/443; 371/67, 68, 14, 9, 23; 244/194; 318/564

[56] References Cited

U.S. PATENT DOCUMENTS

| | | | |
|---|---|---|---|
| 3,593,307 | 7/1971 | Gouge, Jr. et al. | 371/68 |
| 3,805,235 | 4/1974 | Foster et al. | 371/68 |
| 4,032,757 | 6/1977 | Eccles | 371/68 |
| 4,092,716 | 5/1978 | Berg et al. | 364/424 |
| 4,105,900 | 8/1978 | Martin et al. | 244/194 |
| 4,115,847 | 9/1978 | Osder et al. | 364/186 |
| 4,130,241 | 12/1978 | Meredith et al. | 371/68 |
| 4,327,437 | 4/1982 | Gelderloos | 371/68 |

*Primary Examiner*—Parshotam S. Lall
*Assistant Examiner*—Thomas G. Black
*Attorney, Agent, or Firm*—James P. Hamley; B. A. Donahue

[57] ABSTRACT

Each of three redundant sensor sets (16, 18, 20) provides flight status data to a corresponding one of three flight control computers (22, 24, 26). Each of the computers shares sensor data as well as computed control surface command signals with all other system computers. The command signal outputs from two computers are transduced (34, 36) to mechanical commands which are combined and applied to the appropriate aircraft control surface. The remaining computer output is a mathematical model of the mechanical outputs of the other channels. Fault detection and isolation is accomplished by cross channel comparing sensor data, command signals, model/surface position information and by incorporating channel monitors for detecting generic or common mode flight control computer failures.

32 Claims, 4 Drawing Figures

AUTOPILOT FLIGHT DIRECTOR SYSTEM

BACKGROUND OF THE INVENTION

The present invention pertains to the aircraft flight control art and, more particularly, to an improved aircraft autopilot flight director system.

Several aircraft autopilot flight director systems are well known in the prior art. Basically, the function of an autopilot flight director system is to process a series of input signals, such as aircraft acceleration, altitude, gyro data, pilot commands and guidance commands and produce an output command signal suitable for driving an aircraft control surface to control flight in a predetermined manner. Inasmuch as the autopilot flight director system can be in control of aircraft flight during safety critical portions of the flight envelope, such systems normally include redundancy with failure detection to assure continued safe flight following failures within the system.

One such prior art system employs dual/dual control channel redundancy with each control channel including two parallel sensor and computational channels. Here, the two independent, parallel control channels process input data to produce output control signals. Each control channel has redundant sensor inputs which are not shared by the other control channel. Flight computers within each control channel process the redundant sensor information to produce an output command signal which is torque summed with the command signal from the parallel control channel via servo motor actuators and a combining shaft. The shaft is coupled to an aircraft control surface. Each flight computer generates not only an output command signal but also a servo model which provides a simulated channel output. Position feedback sensors provide to each flight computer the status of its corresponding servo motors, whereby the servo outputs may be compared with the servo model. If a significant discrepancy exists between the actual servo output and that of the model, a failure is indicated and the output servo is isolated from the system.

In existing triplex systems, three independent channels, each with its own sensor input data, operate in parallel. The command signal outputs from each channel are coupled through servo motor actuators to a common shaft and control surface.

Both the dual/dual and triplex systems are capable of satisfactory operation in that both provide fail-operational performance following any first channel failure and are capable of providing fail-passive performance following the combination of two channel failures. However, both systems employ a substantial amount of hardware. The dual/dual system normally requires at least four redundant sensor sets, while the triplex system requires only three sensor sets. This additional hardware adds significantly to the cost of the systems. Moreover, in applications such as aircraft wherein weight savings are crucial, elimination of hardware without loss of system performance is a constant goal.

SUMMARY OF THE INVENTION

It is an object of this invention, therefore, to provide an improved aircraft autopilot flight director system which is capable of high level fault detection and isolation and which requires a minimum of parts.

Briefly, according to the invention, an aircraft autopilot flight director system includes first, second and third redundant sensor sets, each sensor set producing a predetermined output data signal related to the status of the aircraft. First, second and third control computers are provided, each of which includes means for:

(a) processing the first, second and third sensor data set signals and producing a reference sensor signal set;

(b) comparing the reference sensor signal set with the reference sensor signal sets of the other two flight control computers and identifying a self-failure in response to a predetermined discrepancy therebetween;

(c) processing the reference sensor signal set and producing command control signals;

(d) comparing the produced command control signals with the command control signals produced by the other two flight computers and identifying a self-failure in response to a predetermined discrepancy therebetween.

Also provided are a means for utilizing the command control signals from at least two of the flight control computers as aircraft surface control commands.

DETAILED DESCRIPTION OF THE PREFERRED EMBODIMENT OF THE INVENTION

Figure 1:
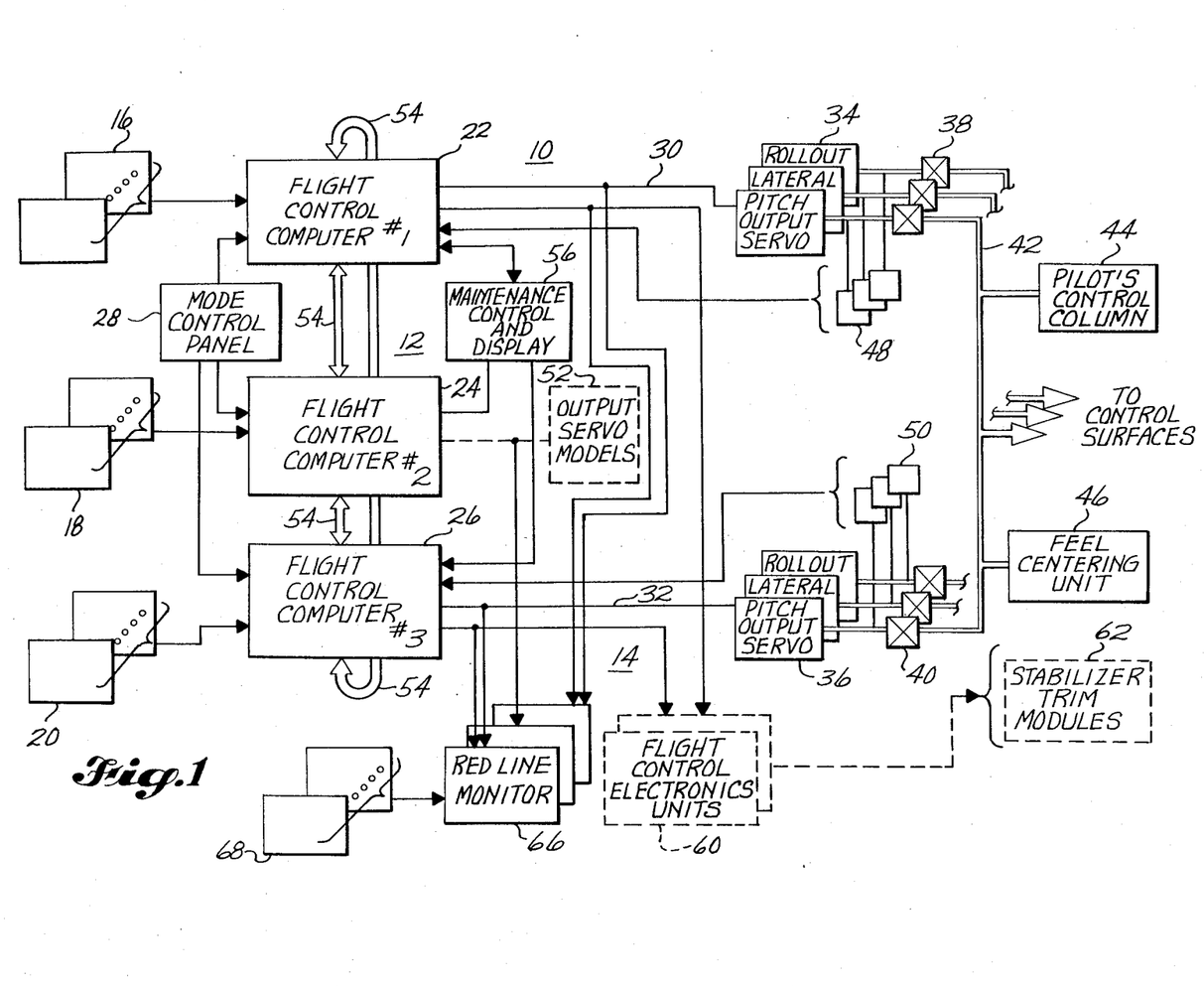
FIG. 1 is a block diagram illustrating the principal components of the aircraft autopilot flight director system according to the invention.

FIG. 1 is a block diagram illustrating the principal components, and the interconnections therein, of the improved aircraft autopilot flight director system.

The system is comprised of three principal channels indicated generally at 10, 12 and 14. Each channel receives data from corresponding sensor sets 16, 18 and 20. The sensor sets 16, 18 and 20 are mutually redundant. Each sensor 16, 18 and 20 provides output data corresponding to the status of flight of the aircraft. Thus, signals corresponding to aircraft acceleration, gyro data, guidance system signals, etc., are produced.

Each sensor set 16, 18 and 20 feeds its sensor data signals to corresponding flight control computers 22, 24 and 26, respectively. Also applied as an input to the flight control computers 22, 24 and 26 is the output from a mode control panel 28 located on the flight deck of the aircraft. The mode control panel 28, in the conventional manner, provides flight crew control of the autopilot flight director system. Signals from mode control panel 28 are used to engage or disengage the autopilot flight director system, to selectively engage particular channels of the system, to input reference values and select/engage command and control modes of the system.

Whereas the discussion with respect to FIGS. 2A–2C describe the operation of each of the flight control computers 22, 24 and 26 in detail, the general operation of these computers may be understood as follows. Each computer 22, 24 and 26 receives sensor data from its corresponding sensor set 16, 18 and 20, respectively. When the system is fully activated, under the control of mode control panel 28, each computer 22, 24 and 26, in accordance with a predetermined control law, processes the input sensor signals and produces a series of output control command signals. In the case of the first and third computers 22, 26, these output command signals are passed on lines 30, 32 to a series of servo command transducers, indicated generally at 34, 36, respectively. The servos 34, 36 transduce the electrical signals from the computers into a corresponding torque applied to an output shaft. In series with the output from each servo set 34, 36 are a series of force limiting cam detents 38, 40, respectively. The cam detents 38, 40 limit the maximum torque which may be applied by the servos 34, 36 to the output control shafts.

Taking, for example, the output from the pitch output servo (with the understanding that the ouputs from the lateral and roll-out servos are handled in the same manner), an output shaft 42 combines the torque output from the first channel servo 34 and the third channel servo 36. This combined torque is then coupled to aircraft control surfaces which, in the case of the pitch output controls, are the aircraft's elevators. Also coupled to the output shaft 42 is the pilot's control column 44 and a feel/centering unit 46. The pilot's control column 44 allows the pilot direct control of the aircraft control surfaces, in the normal manner, and the feel/centering unit 46 not only provides an artificial feel to the pilot's control column, in the normal manner, but also a positioning force on shaft 42 causing the control surface to be deployed in a manner tending to produce trimmed flight.

In the event of a failure in either the first channel 10 or the third channel 14, tending to cause a "hardover" condition, that is, a failure causing a servo to drive to one of its extreme positions, the cam detents 38, 40 limit both the command and restraining torques applied to the output shaft, such as shaft 40, to a predetermined level. This level is designed such that the torque from the remaining operating channel, channel 14, plus that provided by the feel/centering unit 46, causes the output shaft to rotate the control surface to a null, or trimmed level flight position. Thus, the system is initially fail-passive for such a failure. Following detection and successful isolation of the failure, the system performs in a fail-operational manner. In the event that failure detection and isolation are not possible as a result of other causes, the system remains in the fail-passive state.

Should the remaining control channel suffer a subsequent "hardover" failure following isolation of the first failure, the feel/centering unit 46 and the force limiting cam detent are designed with sufficient force limits such that the second hardover channel is counteracted in a manner that resultant aircraft maneuvering flight is limited to a safe value until the flight crew regains system control.

The mechanical outputs from the servos 34, 36 are transduced back to electrical signals via a series of transducers, indicated generally at 48 and 50. Sensors 48, 50 monitor the actual servo output position and provide essential feedback signals to the flight control computers. Those feedback signals are used for closed loop control of each servo position and for failure monitoring of each servo. Each computer, in accordance with programmed control laws, creates an output servo model. This model corresponds to the anticipated servo output position as a function of the input command signal. In the case of the second flight control computer 24, which is the only computer not connected to output servo systems, this output servo model is indicated by block 52.

The computers 22, 24 and 26 interchange sensor data, output command signal data, and servo position data via cross-channel buses 54. In a manner discussed in detail with respect to FIGS. 2A–2C, each computer executes a failure detection program to determine whether or not it or another channel has failed. Normally, the computer is capable of detecting and commanding failure isolation of itself and each servo it controls. In the event that it is incapable of performing these functions, the remaining two computers may collectively agree that a fault exists and can then command isolation of the faulted channel. Both of the remaining computers must agree to the presence of a fault for isolation to occur.

Following detection and isolation of a first failure condition, the remaining two active channels perform similar failure detection functions to determine whether a second failure has occurred. In the event that an unacceptable discrepancy is detected by either or both of the channels, complete isolation of the system is commanded.

The flight crew is provided a continuous display of the system's operational status via the mode control panel 28 and by other flight deck mounted displays Status is normally provided in terms of the remaning autoland capability of the system. The maintenance control and display panel 56 provides a means for storage of detected failure information in non-volatile memory to aid in subsequent trouble-shooting and maintenance repair actions. The maintenance control and display panel 56 also provides maintenance crews with the means for performing automatic and semi-automatic tests to determine the operational status of the system following maintenance actions.

For airplane systems that employ a movable stabilizer for the pitch (longitudinal) trim function, outputs from the first and third computers are also applied to the flight control electronics, indicated generally at 60. The stabilizer trim modules 62 are commanded via the flight control electronics units 60 to reposition the stabilizer such that steady state displacements of the pitch servos 34 and 36 are reduced to near zero. The flight control computers 22, 24 and 26 monitor the position feedback signals 48 and 50 of the pitch servos to detect displacements that exceed a predetermined magnitude for a predetermined time period. If these criteria are exceeded, the stabilizer trim modules are commanded to reposition the stabilizer to reduce the need for steady state displacement of the elevators to near zero. Flight control computer 24 again generates a model command that is used to provide a majority vote or tie-breaking command for failure detection of the system elements used in the automatic pitch trim function.

Other system mechanisms may use separate servos or actuators to reposition the elevator(s) for the pitch trim function. In these cases, the pitch output servos 34 and 36 are off-loaded of steady state displacements by repositioning the separate servos or actuators. This operation is essentially the same as described above. Automatic off-load of steady state commands is not normally provided for lateral and rollout servos. If such a function were required, the principle of operation would be essentially the same as described above.

The output command signals from each of the flight control computers 22, 24 and 26 are monitored by three red-line monitors 66. The red-line monitors 66 process input signals from sensors 68 and may generate command control signals, or an acceptable range thereof, using control laws and hardware totally different from computers 22, 24 and 26. Should a command signal from any of the computers 22, 24 and 26 differ from the acceptable command signal range of its corresponding red-line monitor, the affected channel is disconnected from system operation. The failure of two computers, as detected by the red-line monitors, causes shut-down of the entire system.

Inasmuch as red-line monitors 66 use different software and hardware than computers 22, 24 and 26, they are capable of detecting a generic or common mode design, manufacturing, maintenance or programming error in the main system, thus providing an additional level of fault detection and isolation.

Figure 2A:
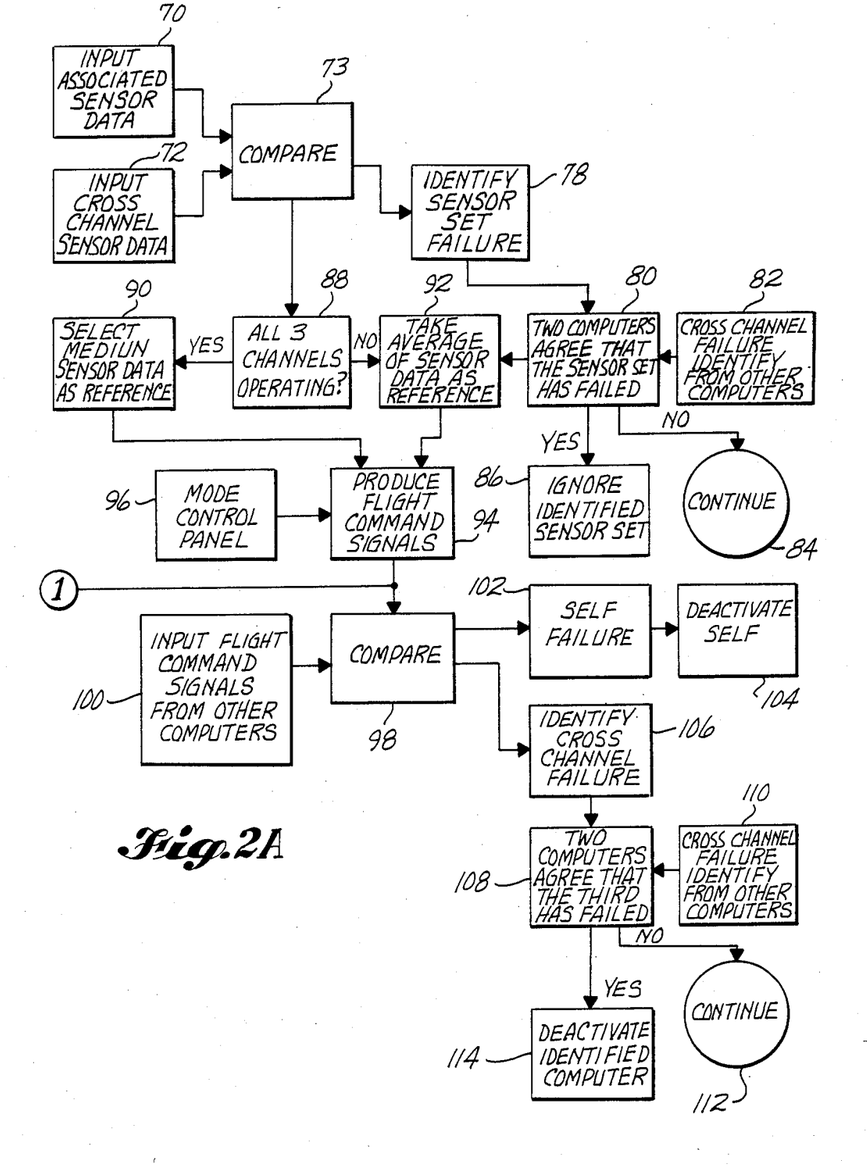
FIGS. 2A, 2B and 2C are detailed logic flow diagrams illustrating the operation of each flight control computer in the system of FIG. 1.
Figure 2B:
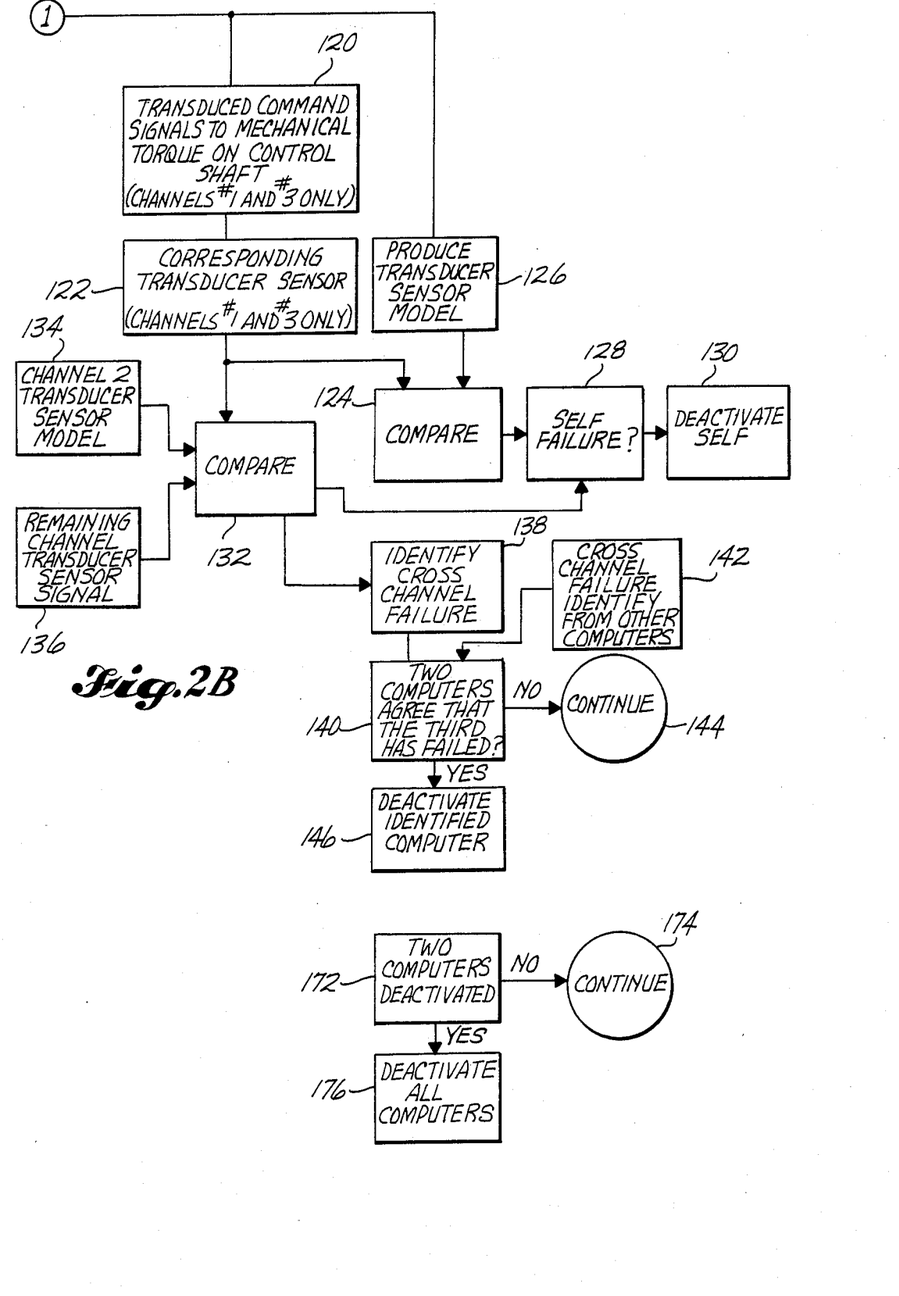

FIGS. 2A, B, C are detailed logic flow diagrams illustrating the operation of each of the flight control computers 22, 24 and 26 shown in FIG. 1. It should be understood that the flight control computers may be capable of performing many functions other than those shown herein, but, for conciseness, such other functions, not relevant to the present invention, will not be described.

Referring to FIG. 2A, each computer inputs and stores data from its corresponding data sensor set, as indicated at block 70. Sensor data from the remaining two channels are also input, via the cross-channel bus, as indicated by block 72. The computer compares its sensor data with the sensor data from the other two channels at block 73.

If, in its comparison at block 73, a computer determines that the sensor data from two data sets agree within tolerance, whereas the sensor data of the third channel is outside of tolerance, this third sensor set is identified as a failure at block 78. At that point, the computer, via the cross-channel bus, determines whether another computer, such as from block 82, agrees that the identified sensor set has failed. If no other computer agrees, the computer continues its logic, as indicated at block 84. If, however, two computers have identified a sensor set as having failed, this sensor set is ignored by the system, as indicated at block 86.

If a computer, at comparison block 73, determines that its sensor data and the sensor data of the other channels are valid, it makes the reference data choice decision, as indicated at block 90. Assuming analog type input data, if the sensor data of all three channels are valid, it selects as its reference sensor data the median of each input sensor data signal sets, at block 90. If only two of the three signals of a sensor set are valid, it takes as its reference sensor data the average of the two valid sensor data signals, at block 92. The reference sensor data, whether from block 90 or block 92 is applied as an input to block 94. A similar algorithm may be used for discrete and digital type input data.

The system continues to operate in a fail-operational manner after any first failure of a sensor set. Second like failures of any sensor set cause system shut-down in a fail-passive manner.

Each computer has stored control laws which define desired command signals as a function of reference sensor signals. Thus, for example, if the flight crew desires automatic control of level flight, an appropriate input is entered at the mode control panel 96 causing a predetermined control law to come into play at block 94. This control law is designed to respond to the sensor signals in such a manner that the output control commands will cause the aircraft to capture and maintain level flight.

A detailed description of particular control laws to be used is not given herein inasmuch as such laws do not directly relate to the present invention. However, such control laws are well known in the art, and are currently being used in several model commercial aircraft.

Each computer then compares, in comparison block 98, the command signals it has produced with those produced by the other computers, as provided at block 100. Should a computer decide that its flight command signals deviate from that of the other two computers by a predetermined tolerance, a self-failure is indicated at block 102. This self-failure causes the computer to deactivate itself from the system, as indicated at block 104.

If a computer determines, however, at comparison block 98 that its produced flight command signals agree within tolerance with the command signals produced by another computer, whereas a third computer has produced out of tolerance command signals, this third channel is identified as a cross-channel failure at block 106. At this point, the computer determines, at block 108, whether another computer has identified the same channel as a cross-channel failure, as input from block 110. If no other computer agrees that this channel has failed, the system continues operation as indicated by 112. If, however, another computer has identified the third computer as having failed, the identified computer is deactivated at block 114.

If a computer has determined that its flight command signals are valid, and thus has not deactivated itself, these command signals are passed down differing logic chains, dependent upon which channel the computer is in. Referring to FIG. 2B, if the computer is in either the first or the third channel, the flight command signals are transduced to a mechanical torque on the control shaft connected to the aircraft control surface, as indicated at block 120. (In FIG. 1, the servos 34, 36 provide this function.) Transducer sensors at 122 transduce the mechanical output from block 120 into a transducer sense signal at block 122. This transducer signal is important to closed loop control of the output servo and the comparisons at blocks 124 and 132 for failure monitoring purposes. The integrity of the signal must be high because loss of the signal will cause the servo to go hardover and the fact of a hardover condition also lost. Two means are available to protect against this kind of failure. The channel driving the servo (1 or 3) must contain an independent "common mode" failure monitor to detect loss of transducer excitation or the loss of the corresponding feedback signal. This method has universal use in present triplex and dual/dual systems. The second choice is to use dual position feedback transducers with the second transducer excited and transduced by another channel. These independent signals can be monitored for unacceptable differences to confirm that the servo position is known with very high integrity. A comparison is then made, at block 124, between the actual transducer sensor signals provided by block 122 and the anticipated, or model, transducer signals calculated in accordance with stored control laws, via block 126. In the event the comparison at block 124 indicates that the actual transducer sensor signals differ by a predetermined tolerance from the sensor model's signals, a self-failure is indicated at block 128. In response to an indicated self-failure, the computer deactivates itself from the system at block 130.

If no self-failure is indicated, the computer compares, at block 132, the transducer sensor signals from its channel with the second channel transducer sensor model signals, as provided by block 134, and with the remaining channel's transducer sensor signals as provided at block 136. If the computer determines that the second channel transducer sensor model signals and the remaining channel's transducer sensor signals agree within tolerance, but that its own sensor signals do not agree with the other two within tolerance, a self-failure is indicated, block 128, and the computer deactivates itself, block 130. Should, however, the computer determine that its transducer sensor signals agree within tolerance with one of the other channels, whereas a third channel is not within tolerance, this third channel is identified as a cross-channel failure at block 138. At this point, the computer makes a determination, at block 140, as to whether or not another computer, as from block 142, has also identified that channel as a cross-channel failure. If there is no such agreement, the computer continues its logic sequence as indicated at 144. If another computer does agree that the third has failed, this third channel is deactivated at block 146.

Figure 2C:
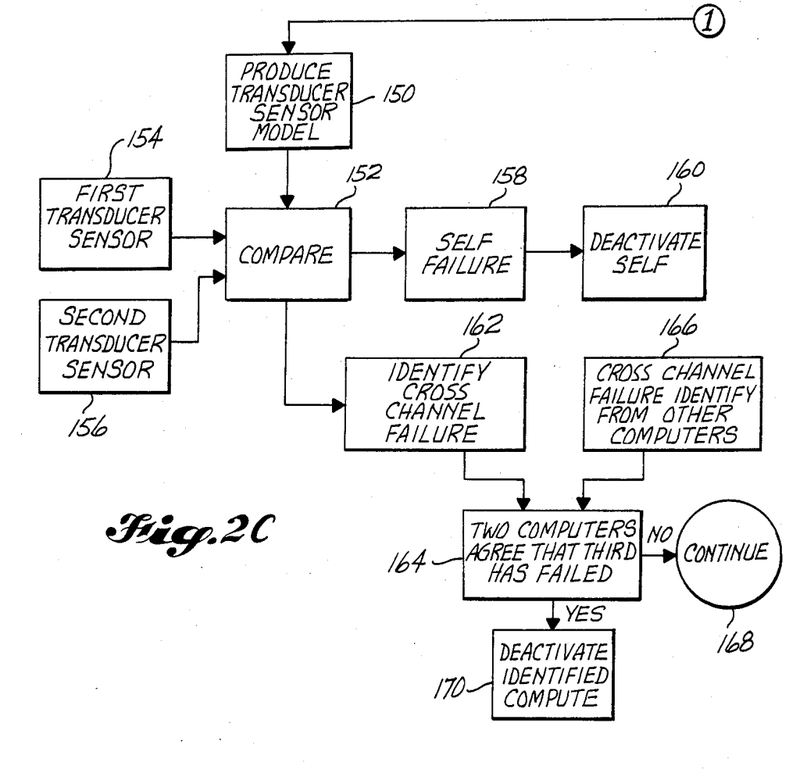

Since the computer in the second channel does not directly drive servo motors, its operation differs from that of the computers in the first and third channels as shown in FIG. 2C. The second channel computer produces anticipated, or model, transducer sensor signals at block 150. These model signals are compared, at block 152, with the first channel transducer sensor signals from block 154 and the second channel transducer sensor signals from block 156. If the second channel computer determines that its model transducer sensor signals differ by a predetermined tolerance from the first and third channel transducer sensor signals, a self-failure is indicated at block 158. In response to a self-failure, the second computer deactivates itself from the system at block 160.

If, however, the second channel computer determines that its transducer sensor model signals agree within tolerance with one of the first transducer sensor signals or the second transducer sensor signals whereas the remaining transducer sensor signals are outside of the tolerance, this channel is identified as a cross-channel failure at block 162. The computer then determines, at block 164, whether or not another computer has also identified this channel as a cross-channel failure, via block 166. If it has not, the computer continues its sequence, at 168. If, however, two computers agree that the third has failed, this third computer is deactivated at block 170.

Referring again to FIG. 2B, upon deactivation of any computer, the remaining active computers then determine whether or not a total of two computers have been deactivated, this at block 172. If not, the active computers continue their logic sequence at 174. Should, however, two computers be deactivated, then the system performs a total shutdown, deactivating all computers at block 176.

In summary, the aircraft autopilot flight director system as described hereinabove provides the first failure operational, second failure passive safety features of dual/dual and triplex systems without the need for an additional set of redundant sensors, as with a dual/dual system and without the need for a third set of output servos, as with the triplex system. Inasmuch as the hardware requirements of the present system are reduced over systems known to the prior art, the present system is less costly to manufacture, install and service, and provides a significant weight reduction and reliability improvement thereover.

While a preferred embodiment of the invention has been described in detail, it would be apparent that many modifications and variations thereto are possible, all of which fall within the true spirit and scope of the invention.

We claim:
1. An aircraft autopilot flight director system comprising:
   first, second and third redundant sensor sets, each sensor set producing predetermined output data signals related to the status of the aircraft;
   first, second and third flight control computers, each computer including means for:
      (a) comparing the associated sensor signal set with the sensor signal sets of the other two flight control computers and identifying a failure in response to a predetermined discrepancy there between;
      (b) processing said first, second and third sensor set data signals and producing a reference sensor signal set;
      (c) processing said reference sensor signal set and producing command control signals;
      (d) comparing said produced command control signals with the command control signals produced by the other two flight control computers and identifying a self-failure in response to a predetermined discrepancy there between;
   utilization means for utilizing the command control signals from at least two of the flight control computers as aircraft surface control commands; and
   common mode fault detection means, utilizing apparatus and control laws unique from any of said first, second and third flight control computers, for independently producing command control signals, said common mode fault means including means for comparing each of said first, second and third flight control computer produced control signals with said independently produced control signals and identifying as a failure each of said computers which produces command controls which deviate from said independently produced command control signal by a predetermined value.

2. The system of claim 1 wherein each of said flight control computers further includes means for:
   comparing its assocated sensor signal set with the sensor signal sets associated with the other two flight control computers and identifying a condition wherein the sensor signal sets of two flight computers agree within a predetermined tolerance whereas the sensor signal set of the remaining flight computer is outside of said predetermined tolerance.

3. The system of claim 2 wherein the utilization means comprises:
   first transducer means coupled to said first flight control computer for transducing the command control signals produced thereby to a corresponding mechanical output;
   second transducer means coupled to said third flight control computer for transducing the command control signals produced thereby to a corresponding mechanical output; and
   means for combining the mechanical outputs from the first and second transducers and coupling the resultant mechanical output to a predetermined control surface of the aircraft.

4. The system of claim 3 further comprising:

a first transducer sensor for producing an output signal representative of the mechanical output of said first transducer;

a second transducer sensor for producing an output signal representative of the mechanical output of said second transducer;

means for coupling said first transducer sensor output signal to the first flight control computer and said second transducer sensor output signal to the third flight control computer;

and wherein each flight control computer includes means for producing a model transducer sensor signal;

said first flight control computer including means for comparing its model transducer produced sensor signal with the first transducer sensor produced output signal and indicating a self-failure in response to a predetermined discrepancy therebetween, said first flight control computer otherwise comparing the first transducer sensor produced output signal with the model transducer sensor signal of the second flight control computer and the second transducer sensor produced output signal and identifying a condition wherein two of said signals are within a predetermined tolerance and the third signal is outside of said tolerance, this condition being identified as a self-failure if the first transducer sensor produced output signal is the signal outside of said predetermined tolerance, the failure otherwise being identified as a cross-channel failure;

said second flight control computer including means for comparing its model transducer produced sensor signal with the first and second transducer sensor produced signals and identifying a condition wherein two of said signals are within a predetermined tolerance and the third signal is outside of said tolerance, this condition being identified as a self-failure if the second flight control computer model signal is the outside of tolerance signal, the failure otherwise being identified as a cross-channel failure; and said third flight control computer including means for comparing its model transducer produced sensor signal with the second transducer sensor produced output signal and indicating a self-failure in response to a predetermined discrepancy therebetween; said third flight control computer otherwise comparing the second transducer sensor produced output signal with the model transducer sensor signal of the second flight control computer and the first transducer sensor produced output signal and identifying a condition wherein two of said signals are within a predetermined tolerance and the third signal is outside of said tolerance, this condition being identified as a self-failure if the second transducer sensor produced output signal is the signal outside of said predetermined tolerance, the failure otherwise being identified as a cross-channel failure.

5. The system of claim 4 wherein each of said flight control computers further includes means for:

comparing its produced command control signals with the produced command control signals of the other two flight control computers and identifying a condition wherein the produced command control signals of two flight computers agree within a predetermined tolerance whereas the produced command control signal of the remaining flight computer is outside of said predetermined tolerance, this condition being identified as a self-failure if the computer performing the comparison is the out of tolerance computer, the condition otherwise being identified as a cross-channel failure.

6. The system of claim 5 wherein each flight control computer includes means for self deactivation from continued system service in response to identifying itself as a self-failure.

7. The system of claim 6 wherein the flight control computers include means for deactivating that flight control computer identified as exhibiting a cross-channel failure by both of the remaining flight control computers.

8. The system of claim 4 wherein each flight control computer includes means for self deactivation from continued system service in response to identifying itself as a self-failure.

9. The system of claim 8 wherein the flight control computers include means for deactivating that flight control computer identified as exhibiting a cross-channel failure by both of the remaining flight control computers.

10. The system of claim 3 wherein each of said flight control computers further includes means for:

comparing its produced command control signals with the produced command control signals of the other two flight control computers and identifying a condition wherein the produced command control signals of two flight computers agree within a predetermined tolerance whereas the produced command control signal of the remaining flight computer is outside of said predetermined tolerance, this condition being identified as a self-failure if the computer performing the comparison is the out of tolerance computer, the condition otherwise being identified as a cross-channel failure.

11. The system of claim 3 wherein each flight control computer includes means for self deactivation from continued system service in response to identifying itself as a self-failure.

12. The system of claim 11 wherein the flight control computers include means for deactivating that flight control computer identified as exhibiting a cross-channel failure by both of the remaining flight control computers.

13. The system of claim 2 wherein each flight control computer includes means for ignoring the data signals from an identified failed sensor signal set.

14. The system of claim 13 wherein the flight control computers include means for deactivating that flight control computer identified as exhibiting a cross-channel failure by both of the remaining flight control computers.

15. The system of claim 2 wherein the flight control computers include means for deactivating all flight control computers from continued system service in response to identifying two of said computers as self-failures or cross-channel failures.

16. The system of either of claims 1 or 2 wherein each of said flight control computers further includes means for:

comparing its produced command control signals with the produced command control signals of the other two flight control computers and identifying a condition wherein the produced command control signals of two flight computers agree within a predetermined tolerance whereas the produced command control signal of the remaining flight computer is outside of said predetermined tolerance, this condition being identified as a self-failure if the computer performing the comparison is the out of tolerance computer, the condition otherwise being identified as a cross-channel failure.

17. The system of claim 16 wherein the flight control computers include means for deactivating all flight control computers from continued system service in response to identifying two of said computers as self failures or cross-channel failures.

18. The system of claim 1 wherein the utilization means comprises:
first transducer means coupled to said first flight control computer for transducing the command control signals produced thereby to a corresponding mechanical output;
second transducer means coupled to said third flight control computer for transducing the command control signals produced thereby to a corresponding mechanical output; and means for combining the mechanical outputs from the first and second transducers and coupling the resultant mechanical output to a predetermined control surface of the aircraft.

19. The system of claim 18 further comprising:
a first transducer sensor for producing an output signal representative of the mechanical ouput of said first transducer;
a second transducer sensor for producing an output signal representative of the mechanical output of said second transducer;
means for coupling said first transducer sensor output signal to the first flight control computer and said second transducer sensor output signal to the third flight control computer;
and wherein each flight control computer includes means for producing a model transducer sensor signal;
said first flight control computer including means for comparing its model transducer produced sensor signal with the first transducer sensor produced output signal and indicating a self-failure in response to a predetermined discrepancy therebetween, said first flight control computer otherwise comparing the first transducer sensor produced output signal with the model transducer sensor signal of the second flight control computer and the second transducer sensor produced output signal and identifying a condition wherein two of said signals are within a predetermined tolerance and the third signal is outside of said tolerance, this condition being identified as a self-failure if the first transducer sensor produced output signal is the signal outside of said predetermined tolerance, the failure otherwise being identified as a cross-channel failure;
said second flight control computer including means for comparing its model transducer produced sensor signal with the first and second transducer sensor produced signals and identifying a condition wherein two of said signals are within a predetermined tolerance and the third signal is outside of said tolerance, this condition being identified as a self-failure if the second flight control computer model signal is the outside of tolerance signal, the failure otherwise being identified as a cross-channel failure; and
said third flight control computer including means for comparing its model transducer produced sensor signal with the second transducer sensor produced output signal and indicating a self-failure in response to a predetermined discrepancy therebetween; said third flight control computer otherwise comparing the second transducer sensor produced output signal with the model transducer sensor signal of the second flight control computer and the first transducer sensor produced output signal and identifying a condition wherein two of said signals are within a predetermined tolerance and the third signal is outside of said tolerance, this condition being identified as a self-failure if the second transducer sensor produced output signal is the signal outside of said predetermined tolerance, the failure otherwise being identified as a cross-channel failure.

20. The system of claim 19 wherein each flight control computer includes means for self deactivation from continued system service in response to identifying itself as a self-failure.

21. The system of claim 20 wherein the flight control computers include means for deactivating that flight control computer identified as exhibiting a cross-channel failure by both of the remaining flight control computers.

22. The system of claim 19 wherein the flight control computers include means for deactivating all flight control computers from continued system service in response to identifying two of said computers as self-failures or cross-channel failures.

23. The system of claim 18 further comprising:
limiting means for limiting the mechanical output of each of said first and second transducer means to a predetermined maximum; and
bias means for applying a predetermined mechanical bias to said control surface of the aircraft such that in the event one of the first and second transducer means produces a mechanical output that is limited by the limiting means, the combined output of the remaining transducer means and the bias means tends to activate the control surface to a position of trimmed aircraft flight.

24. The system of claim 1 wherein each flight control computer includes means for self deactivation from continued system service in response to identifying itself as a self-failure.

25. The system of claim 24 wherein the flight control computers include means for deactivating all flight control computers from continued system service in response to identifying two of said computers as self-failures.

26. An aircraft autopilot flight director system comprising:
first, second and third redundant sensor sets, each sensor set producing predetermined output data signals related to the status of the aircraft;
first, second and third flight control computers, each computer including means for:
(a) comparing the associated sensor signal set with the sensor signal sets of the other two flight control computers and identifying a failure in response to a predetermined discrepancy therebetween;

(b) processing said first, second and third sensor set data signals and producing a reference sensor signal set;

(c) processing said reference sensor signal set and producing command control signals;

(d) comparing said produced command control signals with the command control signals produced by the other two flight control computers and identifying a self-failure in response to a predetermined discrepancy therebetween;

utilization means for utilizing the command control signals from at least two of the flight control computers as aircraft surface control commands, said utilization means further comprising:

first transducer means coupled to said first flight control computer for transducing the command control signals produced thereby to a corresponding mechanical output;

second transducer means coupled to said third flight control computer for transducing the command control signals produced thereby to a corresponding mechanical output; and means for combining the mechanical outputs from the first and second transducers and coupling the resultant mechanical output to a predetermined control surface of the aircraft;

a first transducer sensor for producing an output signal representative of the mechanical output of said first transducer;

a second transducer sensor for producing an output signal representative of the mechanical output of said second transducer;

means for coupling said first transducer sensor output signal to the first flight control computer and said second transducer sensor output signal to the third flight control computer;

and wherein each flight control computer includes means for producing a model transducer sensor signal;

said first flight control computer including means for comparing its model transducer produced sensor signal with the first transducer sensor produced output signal and indicating a self-failure in response to a predetermined discrepancy therebetween, said first flight control computer otherwise comparing the first transducer sensor produced output signal with the model transducer sensor signal of the second flight control computer and the second transducer sensor produced output signal and identifying a condition wherein two of said signals are within a predetermined tolerance and the third signal is outside of said tolerance, this condition being identified as a self-failure if the first transducer sensor produced output signal is the signal outside of said predetermined tolerance, the failure otherwise being identified as a cross-channel failure;

said second flight control computer including means for comparing its model transducer produced sensor signal with the first and second transducer sensor produced signals and identifying a condition wherein two of said signals are within a predetermined tolerance and the third signal is outside of said tolerance, this condition being identified as a self-failure if the second flight control computer model signal is the outside of tolerance signal, the failure otherwise being identified as a cross-channel failure; and said third flight control computer including means for comparing its model transducer produced sensor signal with the second transducer sensor produced output signal and indicating a self-failure in response to a predetermined discrepancy therebetween: said third flight control computer otherwise comparing the second transducer sensor produced output signal with the model transducer sensor signal of the second flight control computer and the first transducer sensor produced output signal and identifying a condition wherein two of said signals are within a predetermined tolerance and the third signal is outside of said tolerance, this condition being identified as a self-failure if the second transducer sensor produced output signal is the signal outside of said predetermined tolerance, the failure otherwise being identified as a cross-channel failure.

27. The system of claim 26 wherein each of said flight control computers further includes means for:

comparing its produced command control signals with the produced command control signals of the other two flight control computers and identifying a condition wherein the produced command control signals of two flight computers agree within a predetermined tolerance whereas the produced command control signal of the remaining flight computer is outside of said predetermined tolerance, this condition being identified as a self-failure if the computer performing the comparison is the out of tolerance computer, the condition otherwise being identified as a cross-channel failure.

28. The system of claim 26 wherein each flight control computer includes means for self deactivation from continued system service in response to identifying itself as a self-failure.

29. The system of claim 26 further comprising:

limiting means for limiting the mechanical output of each of said first and second transducer means to a predetermined maximum; and bias means for applying a predetermined mechanical bias to said control surface of the aircraft such that in the event one of the first and second transducer means produces a mechanical output that is limited by the limiting means, the combined output of the remaining transducer means and the bias means tends to activate the control surface to a position of trimmed aircraft flight.

30. The system of claim 26 wherein each flight control computer includes means for ignoring the data signals from an identified failed sensor signal set.

31. The system of claim 30 wherein the flight control computers include means for deactivating that flight control computer identified as exhibiting a cross-channel failure by both of the remaining flight control computers.

32. The system of claim 31 wherein the flight control computers include means for deactivating all flight control computers from continued system service in response to identifying two of said computers as self-failures.

* * * * *